United States Patent [19]

Smith

[11] Patent Number: 5,263,846

[45] Date of Patent: Nov. 23, 1993

[54] SELF-ACTUATED ROTOR SYSTEM

[75] Inventor: Bert J. Smith, Gloucester Point, Va.

[73] Assignee: The United States of America as represented by the Secretary of the Army, Washington, D.C.

[21] Appl. No.: 946,113

[22] Filed: Sep. 17, 1992

[51] Int. Cl.5 .......................................... B64C 27/54
[52] U.S. Cl. ...................................... 416/36; 416/48; 416/132 R; 416/155
[58] Field of Search ..................... 416/31, 36, 48, 89, 416/132 R, 155, 158, 162, DIG. 5, DIG. 7

[56] References Cited

U.S. PATENT DOCUMENTS

| | | | |
|---|---|---|---|
| 2,108,417 | 2/1938 | Stanley | 416/132 R |
| 2,108,839 | 2/1938 | Wilford et al. | 416/132 R |
| 2,950,768 | 8/1960 | Wagner | 416/132 R |
| 2,978,039 | 4/1961 | Focke | 416/132 R |
| 3,227,221 | 1/1966 | You | 416/132 R |
| 4,137,010 | 1/1979 | Stroub | 416/132 R |
| 4,297,076 | 10/1981 | Donham et al. | 416/DIG. 7 |

FOREIGN PATENT DOCUMENTS

| | | | |
|---|---|---|---|
| 2050522 | 5/1971 | Fed. Rep. of Germany | 416/132 R |
| 606784 | 8/1948 | United Kingdom | 416/132 R |
| 670364 | 4/1952 | United Kingdom | 416/132 R |

Primary Examiner—Richard A. Bertsch
Assistant Examiner—James A. Larson
Attorney, Agent, or Firm—John H. Lamming; Arthur H. Tischer

[57] ABSTRACT

The present invention discloses a main rotor collective pitch control assembly for rotary wing aircraft. The assembly uses segmented rotor blades. The collective pitch of each movable segment may be independently varied, or may be adjusted in unison with one or more other segments on the same or different rotor blades. Control inputs may be made manually by the pilot or may be made by a computer which interprets data pertaining to the vibrational level and velocity of each rotor span. The pilot may override the computer in the event of system failure or if otherwise desired.

6 Claims, 2 Drawing Sheets

SELF-ACTUATED ROTOR SYSTEM

BACKGROUND OF THE INVENTION

1. Technical Field

The present invention relates to a main rotor assembly for rotary wing aircraft. More specifically, the invention relates to segmented rotor blades wherein the collective pitch of the movable segments may be independently varied. Control inputs may be manual, as by the pilot, or may be made by a computer.

The beneficial force that overcomes or counterbalances the weight of an airplane and allows the craft to become and remain airborne is called lift. In helicopters, lift is provided by the rapid rotation of the main rotor blade configuration. The rotor blades are airfoils, meaning that they are designed to produce a resultant force of lift or thrust when air passes over them. Airfoils used in most aircraft are engineered to provide certain flight performance characteristics specified by the designers of the craft. Airfoil design may profoundly affect such performance characteristics as air speeds, maneuverability, lift, airframe vibration, and takeoff/landing capabilities. Often the components of the different flight performance characteristics clash with one another. Thus, one characteristic may be emphasized—steep takeoff and landing capabilities, for example—while another may have to be rectified in unison with the adjustments made to the first. Generally speaking, airfoil engineering and aircraft performance design require compromises. One of the most critical tasks in the design and engineering of an airplane such as a helicopter is that of judiciously compromising design characteristics in such a manner that the aircraft will have optimal capabilities in those performance areas deemed essential to the accomplishment of its mission.

A helicopter is also subject to an array of complex forces which may be detrimental to flight performance on the one hand and potentially destructive of the aircraft on the other. The main rotor assembly is a dynamic complex that receives a variety of severe stresses, including harmonic motion from vibrational resonance, lead-lag oscillations and flapping, turbulence from airflow patterns and Coriolis forces, resultant lift, and induced drag. Therefore, it is vital for the flight performance and also the durability and airworthiness of the craft that the upper and lower surfaces of the rotor be cambered in a manner precisely calculated to serve critical and conflicting aspects of the machine's complex aerodynamics.

The helicopter's main rotor provides lift and thrust, the forces needed for vertical ascent and horizontal movement. An aviator may change the magnitude of lift by adjusting the collective pitch of the helicopter's main rotor blades. Collective pitch may be decreased to a neutral acute angle at which the helicopter can hover. The stresses referred to above are present in all flight operations; they may be brought about by, or changed by, alterations in altitude, velocity, attitude and direction of the aircraft or alterations in climatic and atmospheric conditions. Thus, a change in the collective pitch of the main rotor blades will necessarily alter the forces and stresses to which the airfoils are subject. It must be emphasized in this context, moreover, that the forces and stresses on the airfoil are not uniform on the length of the span. The vortex of air at the rotor tip and the circulation of turbulent air along the span contribute to the nonuniformity. To illustrate this principle further, we can generally say that lift patterns vary between hovering, normal cruise, and critical airspeed operations (one quarter of rotor blade lagging edge approaches stall; stall can spread inboard if collective pitch angle is sufficiently great). It would be beneficial to trim the airfoils in such a way that a maximum efficiency could be obtained by localizing pitch variations to deal with the differing conditions at particular stations on the span. As presently constituted, however, the pitch angle of the entire span must be moved as an integral unit and much efficiency of flight performance is lost. It is this problem and the resultant loss in efficiency of flight that are addressed by the present invention.

2. Description of Related Art

Segmented airfoils have been developed and used on certain kinds of vessels or vehicles to deal with specific challenges raised by the use of rotating twisted radial blades in fluid media to provide forces capable of providing some kind of propulsive force. For example, U.S. Pat. No. 2,969,211 discloses collapsible, inflatable, wind-rotating accordion vanes of airfoil configuration to be used for braking the descent of a rocket-type vehicle on its reentry into the earth's atmosphere from the upper regions of the stratosphere. A configuration of blades applicable to air or water craft is disclosed in U.S. Pat. No. 2,065,254. This configuration provides for spiral rotary wing sections in staggered segments such that adjacent segments or sections may be set at different angles, as measured between the chord of the airfoil and the direction of the prevailing wind.

The use of airfoil configurations to dampen the various stresses to which a primary airfoil (such as the wings of an ordinary airplane) are subject is also known. U.S. Pat. No. 2,124,098, for example, discloses a pivotable airfoil suspended from the fixed wing of an airplane for damping or counteracting flutter forces affecting the wing. U.S. Pat. No. 2,332,516 teaches how flutter and vibration may be damped by setting the vibrational resonance period of a control surface, such as a flap, out of phase with the vibrational frequency of the wing and transmitting the harmonic motion through the control flap linkage.

In the related art, it is believed that fixed segmented rotor blades have been used on experimental helicopters.

SUMMARY AND OBJECTS OF THE INVENTION

A remote actuated rotor system for helicopters comprises tripartite rotor blades including a hub segment, a mid segment and an end segment, the latter two having electric motor actuator means to provide the torque necessary for twistably adjusting the collective pitch angle of each of these two rotor segments separately and individually. The collective pitch angle of the hub segment remains fixed. The tripartite blades may be incorporated into basically any rotor configuration, including those having two, three, four, or more airfoil blades on the main rotor. The mid and end segments of each blade may be adjusted in terms of their collective pitch by a dedicated, redundant computer which "talks" to the on-board flight computers either individually, in unison, or in some combination of them relative to the stationary hub segment. The variable collective pitch adjustment of segmented rotor blades enables the optimization of the collective pitch angle of each movable segment in coordination with the specific conditions that affect opposing forces and stresses on each segment. More efficient rotary wing flight, less vibrations, enhanced durability and reliability of the main rotor assembly components are the benefits derived from the system of this invention.

It is therefore an object of this invention to provide rotor blades having at least three segments including a stationary hub segment, and two or more movable segments which may be individually adjusted in terms of collective pitch angle to optimize the efficiency of helicopter aerodynamics.

It is therefore a further object of this invention to provide rotor blades in tripartite segments, the outer two of which may be individually adjusted in terms of collective pitch angle to optimize the efficiency of helicopter aerodynamics.

It is a further object of this invention to provide a main rotor system for helicopters that reduces opposing forces and stresses on the airframe and the main rotor components to extend the service life and increase the reliability of the aircraft and its critical components.

It is still a further object of the invention to maximize the efficiency of rotary wing flight.

DESCRIPTION OF THE PREFERRED EMBODIMENT

Figure 1:
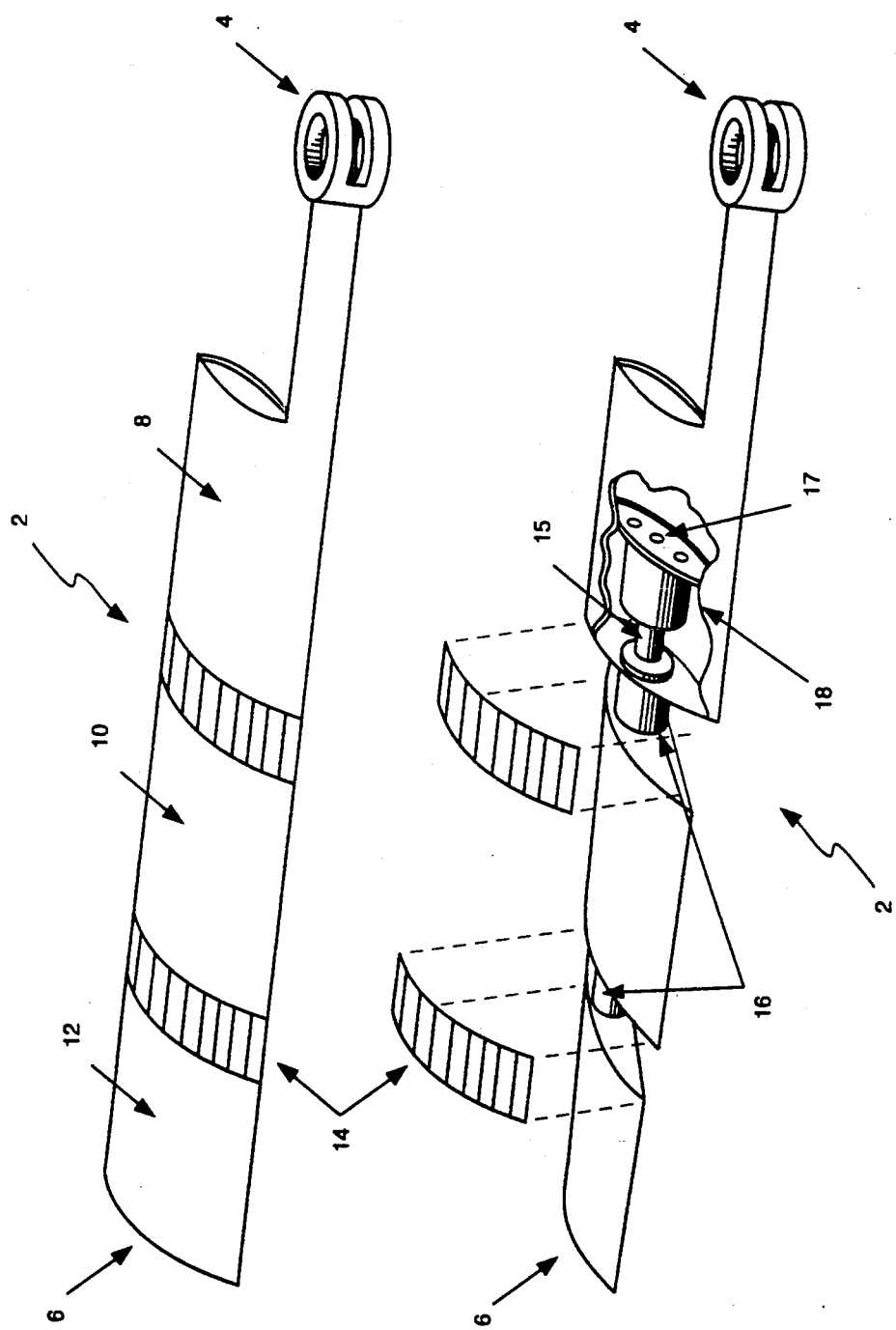
FIG. 1 depicts a rotor blade having a smart actuated rotor system of the invention in its preferred embodiment, in one view; the elastic fairings between rotor segments are cut away to reveal the coupling that connects adjacent segments.

The lift and thrust provided by a rapidly rotating helicopter rotor are subject to stresses and opposing forces. The stresses and forces vary along the span of the rotor. Thus, different stations along the span of each rotor blade on a helicopter are subject to different magnitudes of force opposing lift and thrust and also to different magnitudes of the stresses affecting the dynamic rotor combination. Helicopters lose efficiency of flight due to the fact that rotor blades are longitudinally rigid and integral, so that the collective pitch angle setting adjusts the entire span, notwithstanding the changing and varied aerodynamic environment along the entire length of the span. Efficiency can be maximized by providing for the localized adjustments to collective pitch to meet the special conditions that exist at different stations on the span. An aviator (pilot, co-pilot, or more generically, an operator) in flight may modulate the pitch settings along the span to suit the particular conditions of altitude, atmosphere, prevailing wind conditions, velocity, and so forth, that are present at any given time. Yet basic presettings are also possible, given what is known about the way conditions along the span vary and the models that are available to instruct pilots on the basic patterns of prevailing conditions. If a computer can do this as part of normal flight control, the pilot's work load will be reduced. Reducing the pilot's work load has always been a priority with Army Aviation. This will enable the execution of gross settings to suit a mode of flight (such as hover, cruise, high-speed operation, high maneuverability, etc.) and then to fine tune adjustments as necessary during the flight. While it will always be necessary for pilots to respond reflexively to unexpected conditions in flight, the rotor system of this invention, as described in greater detail below, will not interfere with the pilot's ability to handle the aircraft.

The present invention discloses a rotor blade configuration that allows for the enhancement of helicopter flight efficiency. This is done by segmenting the rotor blade span into at least three sections so that the collective pitch angle of each segment, other than a stationary, pre-set hub segment, may be set separately and individually. In this manner, the collective pitch of each movable segment of the rotor span may be set at the angle which optimizes the performance of the rotor blade at that particular point along the span, given the specific aerodynamic environment at that station. The combination requires an electric actuation system inside the rotor blade to provide the necessary torque for twisting the movable blade segments to the appropriate desired pitch angle. The actuator is an electric motor means; one is located at each coupling. The actuator provides the torque for individual blade segment pitch adjustment. A coupling connects each segment. The aerodynamic shape of the airfoil is preserved by an elastic fairing or skin that covers the gap between blade segments where the coupling lies. The elastic, conformable surface is attached to the outer surface of adjacent blade segments to provide continuity of the surfaces and thus to minimize air flow turbulence and fluid flow boundary layer problems. The rotor blade configuration of the invention may be used on aircraft which utilize basically any rotor blade configuration (two, three, four, etc.), including those that may be characterized as forming a "Y" or "X" pattern. The specific elements of the preferred embodiment of the invention will be described below in relation to FIG. 1 appended hereto.

FIG. 1 shows a segmented helicopter rotor blade 2 of the invention in the preferred embodiment. The rotor blade 2 has a root or hub end 4 and a tip 6. The rotor blades of the preferred embodiment are divided into three segments or sections: the hub segment 8, the mid segment 10, and the end segment 12. The elastic fairing or skin 14 covers the gap between segments where the coupling 16 connects the segments to each other. The couplings are also connected to a control shaft 15. The couplings connect the segment so that the pitch of each movable blade segment is allowed to change independently.

An electric motor actuator 18 is mounted on an elliptical structural member 17 that forms some of the structural foundation of the rotor blade. There is a separate actuator 18 to provide torque for the pitch adjustment of each movable segment (therefore, there are two actuators per rotor blade for the preferred embodiment of the smart actuated system of this invention). The actuator is governed by electrical control signal inputs conveyed through electrical or optical transmission means such as cable or conduit (not shown) which originate from the dedicated digital computer (DDC) (also not shown). Suitable control means include a traditional collective pitch control stick which generates signals to the DDC which in turn decides the selection means to designate the particular span (mid or end) to be affected by the computer's control logic inputs. In the preferred embodiment, it is envisioned that the movable blade segments may either be preset by the DDC and the pitch changed in unison, or the pitch of each movable blade segment may be changed separately and independently. In the same vein it is envisioned that the DDC may change any two segments simultaneously in relation to a stationary third segment if it is desirable to do so. The nature and extent of such pitch changes will be evident to the aviator while the craft is in flight. Control override means will be available to the aviator in the cockpit in case of a system failure.

Figure 2:
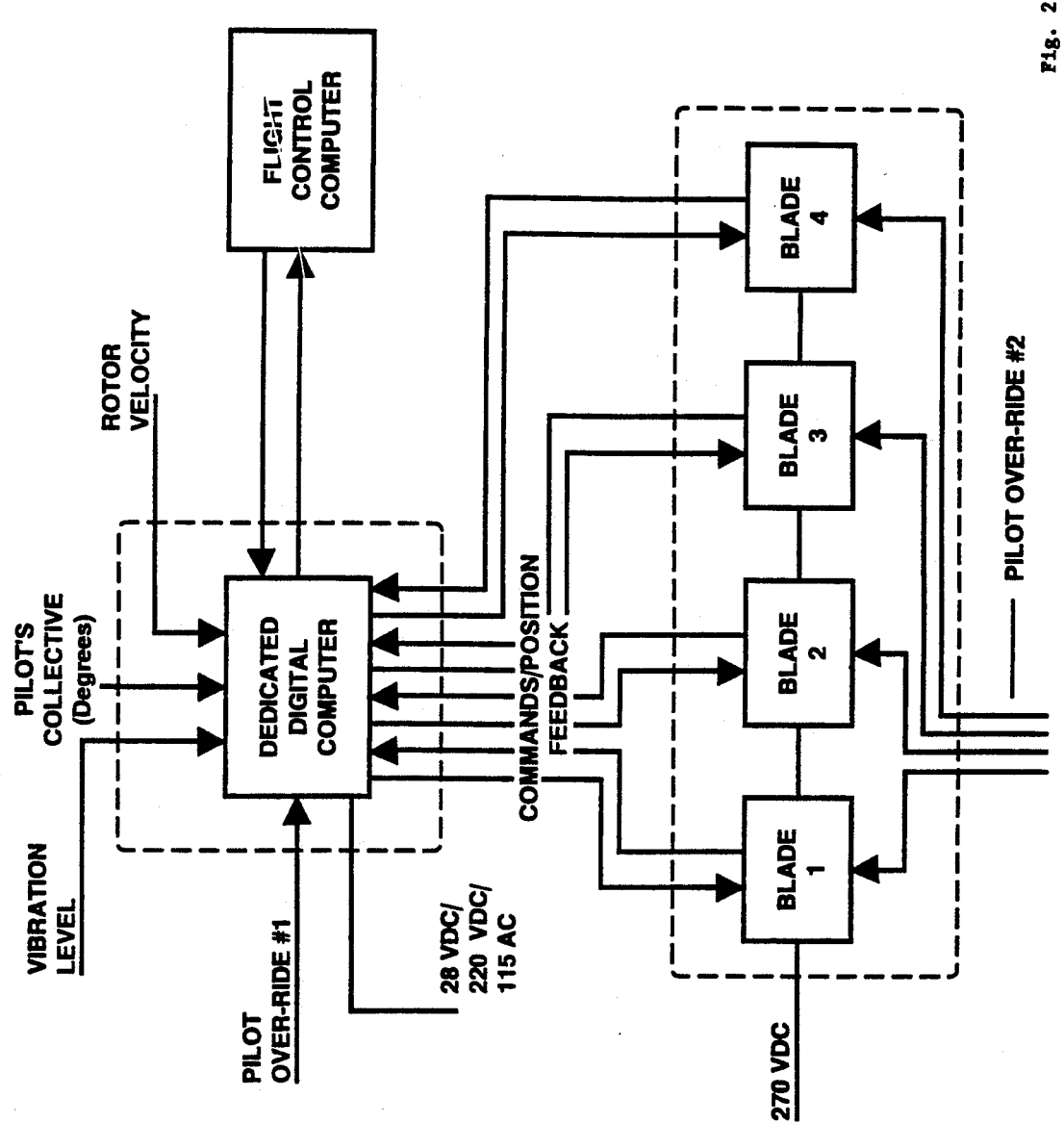
FIG. 2 is a flow chart showing the relationships between the dedicated digital computer, the rotor blades, and system inputs which affect the collective pitch of the movable blade segments.

The functional interrelationships of the different components of a self-actuated rotor system of the invention are set forth in the flow diagram of FIG. 2. The diagram shows that the dedicated digital computer (DDC) receives control inputs from each rotor blade (in the form of vibration level and rotor velocity), the flight control computer, and the pilot's collective control stick. In addition, if desired, the pilot can exercise overriding control over the DDC. This is referred to herein as a first control override means. The pilot can also exercise override control directly over the rotor blades. This is referred to herein as a second control override means. Thus the DDC has a two-way (input and feedback) relationship with the flight computer and with the rotor blades at all times, except when a control override is in use. The first control override may serve to preempt only the feedback impulses from the rotor blades to the DDC while the second control override may serve to preempt the input from the DDC to the rotor blades and the motors mounted thereon to control the pitch angles of the blade span segments.

While the preferred embodiment of the invention has been illustrated and described in the foregoing specification, it is to be understood that the foregoing is not intended to limit the scope of the invention to the precise construction disclosed, and rights are reserved to all changes and modifications falling within the scope of the invention as defined in the claims which follow.

What is claimed is:

1. In a rotary wing aircraft utilizing a main rotor configuration to supply lift and thrust forces for vertical ascent and horizontal movement wherein the main rotor comprises a multiplicity of rotor blades, a remotely actuated, segmented collective pitch control system comprising:
   a. wherein each blade has a hub end and a tip end, and each such blade is divided into three segments, a hub segment, a mid segment, and an end segment, each segment having an airfoil configuration;
   b. coupling means to connect adjacent segments so that the hub segment remains fixed and the mid and end segments may be moved twistably in a manner that changes their collective pitch either individually or in unison;
   c. elastic fairing skin attached to adjacent rotor blade segments to envelope the coupling means;
   d. one electric motor actuator means for each of the mid and end segments, each motor means connected by a control rod to the coupling means for its respective segment to provide torque for twistable movement of the mid and end rotor blade segments;
   e. collective pitch control stick means to enable an operator manually to supply collective control inputs for the main rotor configuration;
   f. means for measuring and quantifying vibration and speed levels of each rotor blade;
   g. dedicated digital computer means to receive and interpret the quantified data on vibration and speed of each rotor blade and to exercise control feedback on the rotor blade segments;
   h. first transmission means from the measuring and quantifying means for sending control inputs to the dedicated digital computer means;
   i. second transmission means from the dedicated digital computer for control inputs to each said electric motor actuator means;
   j. first override control means to enable the operator to override the means for measuring and quantifying vibration and speed levels of the rotor blades and thereby exercise control directly over the dedicated digital computer means; and
   k. second override control means to enable the operator to override the dedicated digital computer control inputs to the electric motor actuator means to enable the operator to exercise control directly over the rotor blade segments.

2. The remotely actuated, segmented collective pitch control system of claim 1 wherein the first and second transmission means comprise electrically conductive cable.

3. The remotely actuated, segmented collective pitch control system of claim 1 wherein the first and second transmission means comprise optical cable.

4. In a rotary wing aircraft utilizing a main rotor configuration to supply lift and thrust forces for vertical ascent and horizontal movement wherein the main rotor comprises a multiplicity of rotor blades, a remotely actuated, segmented collective pitch control system comprising:
   a. wherein each blade has a hub end and a tip end, and each such blade is divided into at least three segments, a hub segment, at least one mid-segment, and an end segment, each segment having an airfoil configuration;
   b. coupling means to connect adjacent segments so that the hub segment remains fixed and the other segments may be moved twistably in a manner than changes the collective pitch of the other segments either individually or in unison;
   c. elastic fairing skin attached to adjacent rotor blade segments to envelope the coupling means;
   d. one electric motor actuator means for each of the segments other than the hub segment, each motor means connected by a control rod to the coupling means for its respective segment to provide torque for twistable movement of the rotor blade segments other than the hub segment;
   e. collective pitch control stick means to enable an operator manually to supply collective control inputs for the main rotor configuration;
   f. means for measuring and quantifying vibration and speed levels of each rotor blade;
   g. dedicated digital computer means to receive and interpret the quantified data on vibration and speed of each rotor blade and to exercise control feedback on the rotor blade segments;
   h. first transmission means from the measuring and quantifying means for sending control inputs to the dedicated digital computer means;
   i. second transmission means from the dedicated digital computer for control inputs to each said electric motor actuator means;
   j. first override control means to enable the operator to override the means for measuring and quantifying vibration and speed levels of the rotor blades and thereby exercise control directly over the dedicated digital computer means; and k. second override control means to enable the operator to override the dedicated digital computer control inputs to the electric motor actuator means to enable the operator to exercise control directly over the rotor blade segments.

5. The remotely actuated, segmented collective pitch control system of claim 4 wherein the first and second transmission means comprise electrically conductive cable.

6. The remotely actuated, segmented collective pitch control system of claim 4 wherein the first and second transmission means comprise optical cable.

* * * * *